United States Patent
Kanazawa et al.

(10) Patent No.: US 9,091,220 B2
(45) Date of Patent: Jul. 28, 2015

(54) START CLUTCH CONTROL DEVICE

(75) Inventors: Satoshi Kanazawa, Saitama (JP);
Takeshi Kurata, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 13/516,200

(22) PCT Filed: Dec. 7, 2010

(86) PCT No.: PCT/JP2010/071893
§ 371 (c)(1),
(2), (4) Date: Jun. 14, 2012

(87) PCT Pub. No.: WO2011/104974
PCT Pub. Date: Sep. 1, 2011

(65) Prior Publication Data
US 2012/0259522 A1    Oct. 11, 2012

(30) Foreign Application Priority Data

Feb. 23, 2010 (JP) .................. 2010-037964

(51) Int. Cl.
*F02D 29/00* (2006.01)
*F16H 59/14* (2006.01)
(Continued)

(52) U.S. Cl.
CPC .............. *F02D 29/00* (2013.01); *F02D 41/022* (2013.01); *F16D 48/08* (2013.01); *F16H 59/14* (2013.01); *F16D 2500/3064* (2013.01); *F16D 2500/30803* (2013.01); *F16D 2500/30806* (2013.01);

(Continued)

(58) Field of Classification Search
CPC ....... F02D 29/00; F02D 41/022; F02D 48/08; F16H 59/14; F16D 2500/3144; F16D 2500/7044; F16D 2500/30806; F16D 2500/3064; F16D 2500/50224; F16D 2500/30803
USPC .................. 701/54, 51, 67; 475/210
See application file for complete search history.

(56) References Cited

U.S. PATENT DOCUMENTS 4,748,870 A * 6/1988 Sugino et al. ............. 477/117
4,815,340 A * 3/1989 Iwatsuki et al. ............ 477/98
(Continued)

FOREIGN PATENT DOCUMENTS

EP   0760442 A1   3/1997
EP   1621789 A2   2/2006
(Continued)

OTHER PUBLICATIONS

European Search Report EP Application No. 10846637.6, Jul. 9, 2013, 3 pages.

*Primary Examiner* — Helal A Algahaim
*Assistant Examiner* — Genna Mott
(74) *Attorney, Agent, or Firm* — Squire Patton Boggs (US) LLP

(57) ABSTRACT

A first torque determining unit determines a value of a torque input to a transmission on the basis of a load acting on a start clutch (12), and a second torque determining unit determines a value of a torque input to the transmission on the basis of a manipulated amount of an accelerator pedal. After the accelerator pedal is manipulated while the start clutch (12) is in a released state, as long as the torque determined by the first torque determining unit (31*a*1) is less than the torque determined by the second torque determining unit (31*a*2), the torque input to the transmission is limited to the torque determined by the first torque determining unit (31*a*1).

6 Claims, 5 Drawing Sheets

(51) Int. Cl.
*F02D 41/02* (2006.01)
*F16D 48/08* (2006.01)

(52) U.S. Cl.
CPC .................. *F16D2500/3144* (2013.01); *F16D 2500/50224* (2013.01); *F16D 2500/7044* (2013.01)

(56) References Cited

U.S. PATENT DOCUMENTS

| | | | |
|---|---|---|---|
| 5,018,068 A * | 5/1991 | Aoki et al. ...................... | 701/53 |
| 5,050,454 A * | 9/1991 | Yamaguchi et al. ........... | 477/109 |
| 5,583,768 A * | 12/1996 | Hamajima et al. .............. | 701/53 |
| 5,908,368 A * | 6/1999 | Sawamura et al. ............ | 477/109 |
| 6,093,974 A * | 7/2000 | Tabata et al. ................ | 290/40 R |
| 6,347,275 B1 * | 2/2002 | Nakano ........................ | 701/104 |
| 6,434,466 B1 * | 8/2002 | Robichaux et al. ............ | 701/54 |
| 6,464,617 B1 * | 10/2002 | Lee ............................... | 477/154 |
| 6,549,839 B2 * | 4/2003 | Katakura et al. ................ | 701/54 |
| 6,584,392 B1 * | 6/2003 | Jankovic et al. ................ | 701/54 |
| 6,634,984 B1 * | 10/2003 | Doering et al. ................ | 477/107 |
| 6,641,504 B2 * | 11/2003 | Genise et al. ................ | 477/107 |
| 6,793,606 B2 * | 9/2004 | Doh ............................... | 477/115 |
| 6,960,153 B2 * | 11/2005 | Ochiai et al. ................ | 477/107 |
| 6,997,831 B2 * | 2/2006 | Kanda et al. ...................... | 474/8 |
| 7,003,394 B2 * | 2/2006 | Takahashi et al. ............. | 701/104 |
| 7,286,922 B1 * | 10/2007 | Fischer et al. ................ | 701/51 |
| 8,214,116 B2 * | 7/2012 | Whitton ........................ | 701/55 |
| 2007/0082781 A1 * | 4/2007 | Eguchi et al. ................ | 477/44 |
| 2008/0318727 A1 * | 12/2008 | Matsubara et al. ............. | 477/3 |
| 2011/0213518 A1 * | 9/2011 | Welchko et al. ................ | 701/22 |

FOREIGN PATENT DOCUMENTS

| | | |
|---|---|---|
| EP | 1752331 A1 | 2/2007 |
| JP | 61-046725 A | 3/1986 |
| JP | 2005-232983 A | 9/2005 |
| JP | 2006-170150 A | 6/2006 |
| JP | 2009-024646 A | 2/2009 |

\* cited by examiner

START CLUTCH CONTROL DEVICE

CROSS-REFERENCED TO RELATED APPLICATION

This application is a National Stage entry of International Application PCT/JP2010/0071983, filed Dec. 7, 2010, which claims priority to Japanese Patent Application No. 2010-037964, filed Feb. 23, 2010, the disclosure of the prior applications are hereby incorporated in its entirety by reference.

TECHNICAL FIELD

The present invention relates to a start clutch control device for controlling an output torque by a driving source of a vehicle at the startup of the vehicle.

BACKGROUND ART

Hitherto, as a control device for controlling an output torque of a driving source at the startup of a vehicle, there has been disclosed a control device in the following Patent document 1, for example. According thereto, when a start clutch is in a released state, by limiting the output torque of an engine of the vehicle, the revolution number of the engine is prevented from becoming too great.

CITATION LIST

Patent Documents

Patent document 1: Japanese Patent Laid-open No. 2009-24646

SUMMARY OF INVENTION

Technical Problem

However, the torque control of the transmission to which the output torque of the engine is input and the load control of the start clutch to which the output torque of the transmission is input as the start clutch is engaged are performed separately.

As the load on the start clutch varies, the input torque of the transmission may not be appropriately controlled. For example, when the load on the start clutch is smaller than the input torque of the transmission, the load relative to the output torque of the engine is smaller; thereby, the revolution number of the engine increases. Such fluctuation on the revolution number of the engine may be a reason for hindering a smooth startup of the vehicle.

It is therefore an object of the present invention to provide a start clutch control device configured to restrain a revolution number of an engine to enable a smooth startup by controlling an input torque of a transmission according to a load on a start clutch at the startup.

Solution to Problem

The present invention provides a start clutch control device which is configured to control a connection between a driving side and a driven side of a vehicle through a start clutch disposed between the two sides and comprises: a first torque determining unit configured to determine a value of a torque input from a driving source of the vehicle to a transmission of the vehicle on the basis of a load acting on the start clutch; a second torque determining unit configured to determine a value of a torque input to the transmission of the vehicle from the driving source of the vehicle on the basis of a manipulated amount of an accelerator pedal of the vehicle; and a torque limiting unit configured to limit the torque to the value determined by the first torque determining unit as long as the value determined by the first torque determining unit is less than the value determined by the second torque determining unit after the accelerator pedal is manipulated while the start clutch is in a released state.

According to the present invention, after the accelerator pedal is manipulated while the start clutch is in the released state, the torque limiting unit limits the torque input to the transmission to the value determined by the first torque determining unit on the basis of the load acting on the start clutch as long as the value determined by the first torque determining unit is less than the value determined by the second torque determining unit on the basis of the manipulated amount of the accelerator pedal of the vehicle.

According thereto, the revolution number of the engine is restrained so that the input torque of the transmission at the startup of the vehicle is smaller than the torque output from the driving source according to the manipulated amount of the accelerator pedal so as to enable a smooth startup.

In the present invention, it is preferable that the first torque determining unit is provided with a cooling water temperature detecting unit configured to detect a temperature of cooling water used to inhibit a temperature of the driving source from increasing and a torque correcting unit (e.g., a second torque correcting unit) configured to correct the value of the torque input to the transmission according to the temperature, and the second torque correcting unit corrects the torque input to the transmission according to a correction factor possessing such a characteristic that the value thereof decreases or remains at the same value as the temperature increases.

If the temperature of the cooling water is low, a delay in the response of the output torque of the transmission occurs; therefore, by correcting the output torque of the driving source to be greater, the decrement or delay in the response of the output torque of the transmission can be compensated.

In the present invention, it is preferable that the first torque determining unit is provided with a transmission ratio calculating unit configured to calculate a transmission ratio of the transmission and a torque correcting unit (e.g., a third torque correcting unit) configured to correct the value of the torque input to the transmission according to the transmission ratio.

If the transmission ratio of the transmission calculated by the transmission ratio calculating unit varies, the torque output from the transmission fluctuates; however, by correcting the torque input to the transmission according to the transmission ratio through the third torque correcting unit, the output torque of the transmission can be corrected appropriately.

In the present invention, it is preferable that the transmission ratio calculating unit calculates the transmission ratio denoted by a rate between an output torque of a driven side and an input torque of a driving side of the transmission, and the third torque correcting unit corrects the torque input to the transmission according to a correction factor possessing such a characteristic that the value thereof decreases or remains at the same value as the transmission ratio increases.

In general, as the transmission ratio (a rate obtained by dividing the output torque by the input torque) calculated on the basis of the output torque is greater, the torque output from the transmission becomes greater as well; by correcting the torque input to the transmission to be smaller through the second torque correcting unit, the increment of the output torque of the transmission is inhibited. Moreover, as the transmission ratio calculated on the basis of the output torque is smaller, the torque output from the transmission becomes smaller as well; by correcting the torque input to the transmission greater through the second torque correcting unit, the decrement of the output torque of the transmission is compensated.

According thereto, it is possible to correct the output torque appropriately with respect to the load on the start clutch.

In the present invention, it is preferable that the transmission ratio calculating unit calculates the transmission ratio denoted by a rate between a revolution number of a driving side and a revolution number of a driven side of the transmission, and the third torque correcting unit corrects the torque input to the transmission according to a correction factor possessing such a characteristic that the value thereof decreases or remains at the same value as the transmission ratio increases.

In general, as the transmission ratio (a rate obtained by dividing the input revolution number by the output revolution number) calculated on the basis of the revolution number is greater, the torque output from the transmission becomes greater as well; by correcting the torque input to the transmission to be smaller through the second torque correcting unit, the increment of the output torque of the transmission is inhibited. Moreover, as the transmission ratio calculated on the basis of the revolution number is smaller, the torque output from the transmission becomes smaller as well; by correcting the torque input to the transmission to be greater through the second torque correcting unit, the decrement of the output torque of the transmission is compensated.

According thereto, it is possible to correct the output torque appropriately with respect to the load on the start clutch.

In the present invention, it is preferable that the first torque determining unit is provided with a torque correcting unit (e.g., a first torque correcting unit) configured to correct the value of the torque input to the transmission according to a variation amount of the load acting on the start clutch; the first torque correcting unit corrects the torque input to the transmission according to a correction value possessing such a characteristic that the value thereof increases or remains at the same value as the load variation amount increases.

According thereto, it is possible to increase the output torque of the driving source by increasing the variation amount of the load acting on the start clutch without increasing the revolution number of the engine; thereby, it is possible to correct the torque input to the transmission appropriately.

BRIEF DESCRIPTION OF THE DRAWINGS

FIG. 2 is a flow chart illustrating a procedure of a control process of the start clutch performed by a CPU of a start clutch control device in. FIG. 1;

FIG. 3($b$) is an example graph illustrating a characteristic between a desired pressure value PCCMD of the start clutch and the load upper limit value a0 of the start clutch according to an embodiment of the present invention;

FIG. 3($c$) is an example graph illustrating a characteristic between an engine cooling water temperature TW and a torque correction factor a1 according to an embodiment of the present invention;

FIG. 3($d$) is an example graph illustrating a characteristic between a transmission ratio TR of a transmission and a torque correction factor a2 according to an embodiment of the present invention;

FIG. 3($e$) is an example graph illustrating a characteristic between a variation amount of a pressure of the start clutch and a variation amount of the load upper limit value of the start clutch ΔTQ according to an embodiment of the present invention.

DESCRIPTION OF EMBODIMENTS

Figure 1:
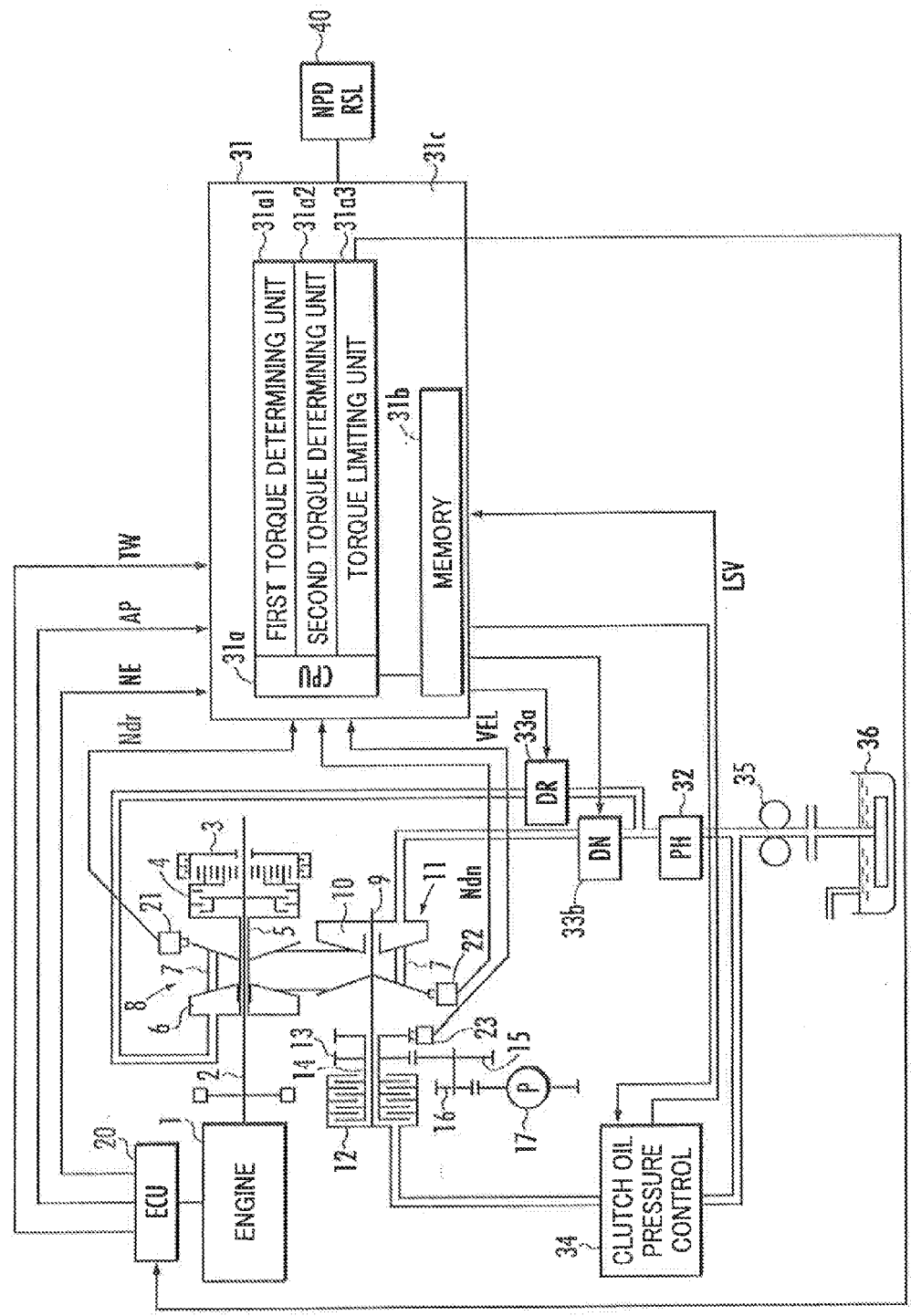
FIG. 1 is a diagram illustrating a schematic configuration of a start clutch control device according to an embodiment of the present invention.

FIG. 1 is a diagram illustrating a configuration of a start clutch control device according to an embodiment of the present invention. The present embodiment relates to a clutch control device of a vehicle using an engine (internal combustion engine) as a driving source, and a transmission used in the vehicle is a continuous variable transmission (CVT).

In FIG. 1, a driving shaft 2 for transmitting an output from the engine 1 of the vehicle is joined to an input shaft 5 of the transmission through a forward-backward movement switching mechanism 3 and a forward clutch 4. The input shaft 5 is disposed with a variable pulley (hereinafter, referred to as "driving side pulley") configured to have the width of a V groove, namely the wrapping diameter of a driving belt 7 be adjusted via a variable oil pressure cylinder 6.

The driving belt 7 is wrapped on the driving side pulley 8 of the transmission and a variable pulley (hereinafter, referred to as "driven side pulley") 11 disposed on a driven shaft 9 of the transmission. The driven side pulley 11 is also configured to have the width of the V groove, namely the wrapping diameter of the driving belt 7 be adjusted via a variable oil pressure cylinder 10.

The continuous variable transmission is constructed by the constituent elements of 3 to 11 mentioned above. The driven shaft 9 is joined to an output shaft 14 disposed with an output gear 13 via a start clutch 12 having a clutch piston which is not shown in the drawings, and the output gear 13 is joined to a differential device 17 via intermediate gears 15 and 16.

In the gear engaged state, the torque transmitted from the engine 1 to the driving shaft 2 is transmitted to the driving side pulley 8 via the forward clutch 4, and is then transmitted to the driven side pulley 11 via the driving belt 7. When the accelerator pedal is stepped down, the torque of the driven side pulley 11 is transmitted to the output shaft 14 via the start clutch 12, and the torque of the output shaft 14 is transmitted to right and left driving wheels (not shown) via the output gear 13, the intermediate gears 15 and 16, and the differential device 17.

The revolution and the output torque of the engine 1 are controlled by an electronic control unit (ECU) 20. The ECU 20 is connected by a transmission control device 31 configured to control oil pressures of the oil pressure cylinders 6 and 10 and the like.

The transmission control device 31 is composed of a CPU 31$a$ for executing various arithmetic computation processes, a storage device (memory) 31$b$ composed of a ROM and a RAM for storing various arithmetic computation programs executed in the CPU 31$a$, various tables to be described later, arithmetic computation results and the like, and an input-output interface 31c configured to receive various electric input signals and output driving signals (electric signals) on the basis of the arithmetic computation results and the like to the external side.

In the present embodiment, the transmission control device 31 is configured as the start clutch control device which also performs the start clutch control. Thus, the start clutch control process (a process by a first torque determining unit 31a1, a process by a second torque determining unit 31a2 and a process by a torque limiting unit 31a3) to be described hereinafter is executed by the CPU 31a of the transmission control device 31. In one embodiment, it is preferable that the first torque determining unit 31a1 (also referred to herein as the first torque determining device) is provided with a cooling water temperature detecting unit (shown in FIG. 5) configured to detect a temperature of cooling water used to inhibit a temperature of the driving source from increasing.

The transmission control device 31 is fed with values output by the ECU 20 such as an engine revolution number NE, a accelerator opening degree AP varying in response to the manipulation of the accelerator pedal (not shown), and an engine water temperature TW.

The transmission control device 31 is also fed with an output from an input shaft rotation sensor 21 installed nearby the driving side pulley 8 for detecting a revolution number Ndr of the input shaft 5, an output from a driven shaft rotation sensor 22 installed nearby the driven side pulley 11 for detecting a revolution number Ndn of the driven shaft 9, and an output from an output shaft rotation sensor 23 installed nearby the output shaft 14 for detecting a vehicular velocity VEL.

The transmission control device 31 is configured to provide current signals for actuating a linear solenoid valve of the start clutch oil pressure control device 34 and to detect a voltage value LSV applied to the solenoid.

Furthermore, the transmission control device 31 is connected by a transmission selector (a transmission ratio selecting device) 40 of automatic transmission. The state of a select lever (not shown) of the selector 40 is detected and fed into the transmission control device 31. In the present embodiment, the selector 40 is configured to be selectable among 6 ranges: neutral (N), parking (P), drive (D), reverse (R), second (S) and low (L)

The transmission control device 31 is configured to output signals for generating a driving side pulley oil pressure (DR) and a driven side pulley oil pressure (DN) and signals for actuating the linear solenoid valve of the start clutch oil pressure control device 34 to control oil pressure generating devices 33a and 33b, and signals for controlling the output torque of the engine 1 to the ECU 20, respectively.

An oil inlet side of a pressure head (PH) generating device 32 is connected to an oil tank 36 via an oil pump 35. An oil outlet side of the PH generating device 32 is connected to oil inlet sides of the control oil pressure generating device 33a and 33b to feed the oil pressures from the PH generating device 32 to the control oil pressure generating devices 33a and 33b.

An oil outlet side of the control oil pressure generating device 33a is connected to the oil pressure cylinder 6, and an oil outlet side of the control oil pressure generating 33b is connected to an oil inlet side of the oil pressure cylinder 10; thereby, the oil pressures are adjusted according to the control signals from the transmission control device 31 and are supplied to the oil pressure cylinders 6 and 10, respectively.

Figure 5:
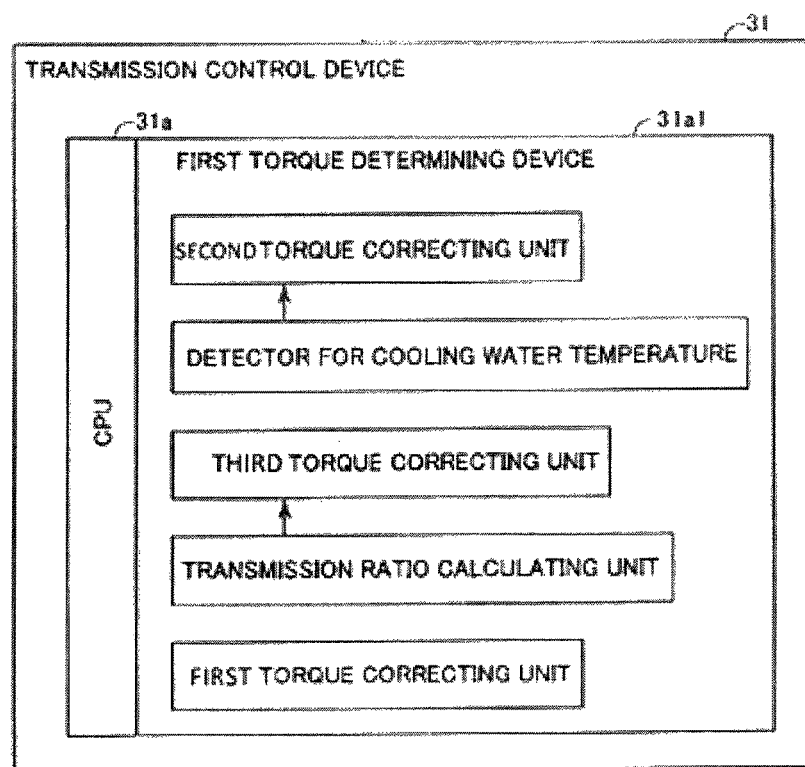
FIG. 5 is an embodiment of a start clutch control device according to the present invention.

Therefore, the transmission ratio of the continuous variable transmission is determined through the determination of the widths of V grooves of the driving side pulley 8 and the driven side pulley 11 on the basis of the oil pressures supplied from the control oil pressure generating devices 33a and 33b to the oil pressure cylinders 6 and 10, respectively. As shown in FIG. 5, it is preferable that the first torque determining device 31a1 is provided with a cooling water temperature detecting unit configured to detect a temperature of cooling water used to inhibit a temperature of the driving source from increasing and a torque correcting unit (e.g., a second torque correcting unit) configured to correct the value of the torque input to the transmission according to the temperature, and the second torque correcting unit corrects the torque input to the transmission according to a correction factor possessing such a characteristic that the value thereof decreases or remains at the same value as the temperature increases. As further shown in FIG. 5, it is preferable that the first torque determining unit 31a1 is provided with a transmission ratio calculating unit configured to calculate a transmission ratio of the transmission and a torque correcting unit (e.g., a third torque correcting unit) configured to correct the value of the torque input to the transmission according to the transmission ratio. In addition, it is preferable, as shown in FIG. 5, that the first torque determining unit 31a1 is provided with a torque correcting unit (e.g., a first torque correcting unit) configured to correct the value of the torque input to the transmission according to a variation amount of the load acting on the start clutch; the first torque correcting unit corrects the torque input to the transmission according to a correction value possessing such a characteristic that the value thereof increases or remains at the same value as the load variation amount increases.

Next, the description will be carried out on the start clutch control process executed by the CPU 31a of the transmission control device 31 serving as the start clutch control device. In the present embodiment, the CPU 31a functions as the first torque determining unit 31a1, the second torque determining unit 31a2, and the torque limiting unit 31a3 in the present invention.

Figure 2:
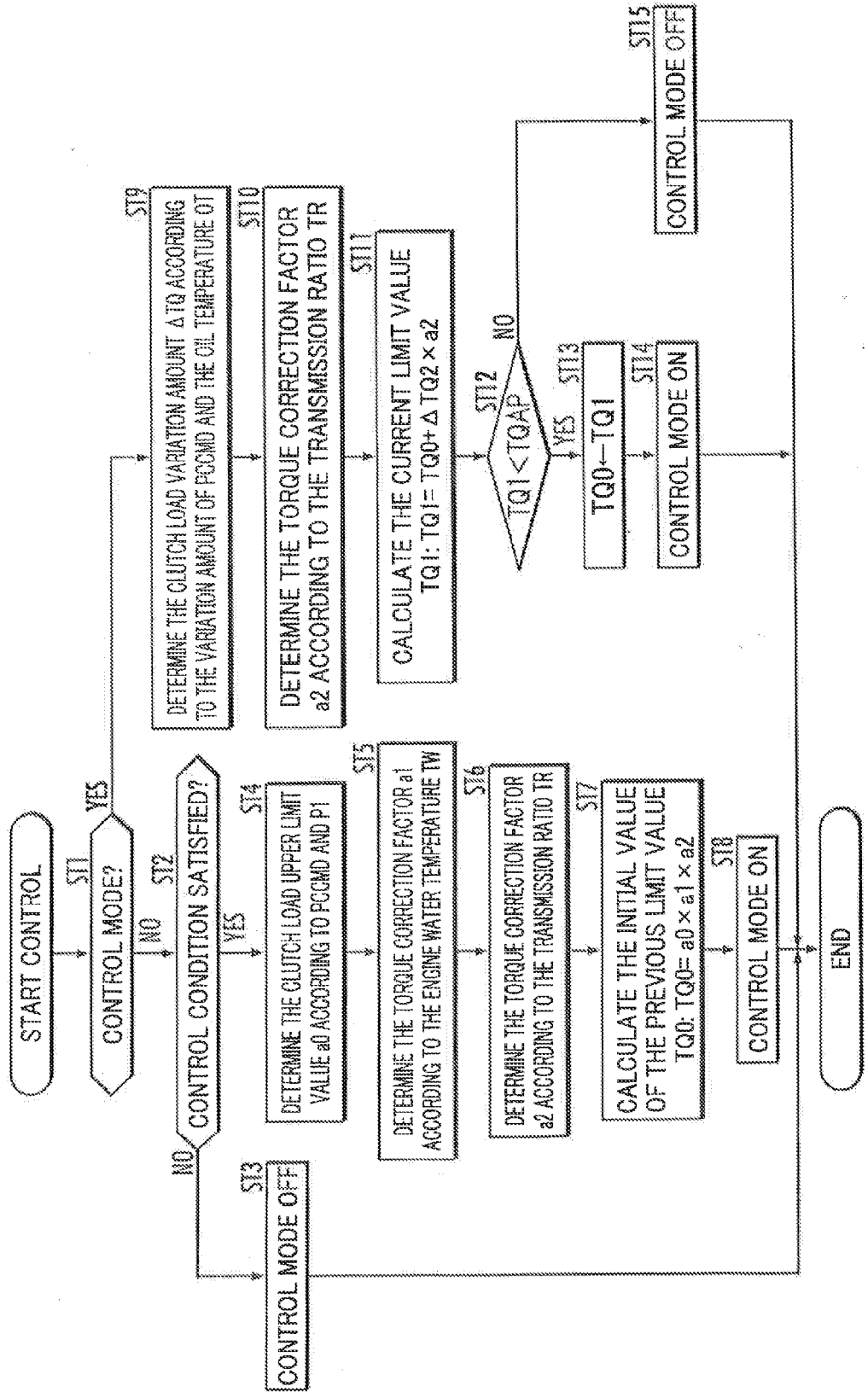

FIG. 2 is a flow chart illustrating a procedure of the start clutch control process executed by the CPU 31a. The control process program illustrated by the flow chart is called up and executed at predetermined time intervals (for example, every 10 msec).

In the control process, at the first step ST1, the transmission control device 31 judges whether the control mode is on or off. If it is in an off state, the procedure advances to step ST2.

At step ST2, the transmission control device 31 judges whether or not a control condition is satisfied. Specifically, whether an oil temperature OT is not greater than a predetermined value V1, whether the desired pressure value PCCDMD of the start clutch is not greater than a predetermined value V2, whether a slip factor ESC of the start clutch is not smaller than a predetermined value V3, whether the vehicular velocity VEL is not greater than a predetermined value V4, and whether the accelerator pedal is being manipulated are judged, and when all the judgment results are affirmative (YES), the control condition is judged to be satisfied. The desired pressure value PCCDMD of the start clutch is referred to as a desired value of a pressure acting on the start clutch.

When the oil temperature OT is low, the transmission of the oil pressure of the start clutch delays, and meanwhile, since the friction factor of the start clutch is small, the start clutch becomes easy to slip; consequently, it is easy for the load on the start clutch to become small. Under consideration of this fact, the predetermined value V1 is set at a value by which it is possible to determine that the output torque of the engine should be limited.

The oil temperature OT is estimated as follows. As mentioned above, a resistance value of the solenoid is obtained from the current value supplied from the CPU 31a to the solenoid of the start clutch oil pressure control device 34 and the voltage value LSV applied to the solenoid; on the basis of a table denoting a relationship between resistance values of the solenoid and temperatures, the temperature of the solenoid is determined, and the determined temperature of the solenoid is estimated as the oil temperature OT.

The clutch piston of the start clutch is built with a spring. As the start clutch is engaged, the spring is pressed. Therefore, when the desired pressure value PCCMD of the start clutch is smaller than a pressure pressing the spring to initiate the engagement (hereinafter, referred to as "reactive stroke pressure"), the start clutch is in a released state. The predetermined value V2 is set at a value by which it is possible to determine whether or not the start clutch is in the released state.

The predetermined value V3 is set at a value so that it is possible to determine whether or not the start clutch is in the released state according to the slip factor (ease to slip) of the start clutch.

When a torque converter is used in the start clutch, the vehicle advances according to a creep phenomenon. Since the present control is performed at the startup, the predetermined value V4 is set at a value by which it is possible to judge whether the vehicular velocity of the vehicle is not greater than a velocity of the vehicle advanced according to the creep phenomenon so as to differentiate from the normal running.

The judgment at step ST2 is performed by using the above four predetermined values of V1 to V4. When the start clutch is in the released state and the accelerator pedal is manipulated, all the conditions are satisfied.

If it is determined to be NO at step ST2, the procedure advances to step ST3 where the transmission control device 31 turns off the control mode (e.g., changes the state to control mode off) and terminates the control process.

If it is determined to be YES at step ST2, the procedure advances to step ST4 where the transmission control device 31 determines an load upper limit value a0 of the start clutch. The load upper limit value a0 of the start clutch is determined by searching a preliminarily prepared table possessing a characteristic as illustrated in FIG. 3(a).

Figure 3:
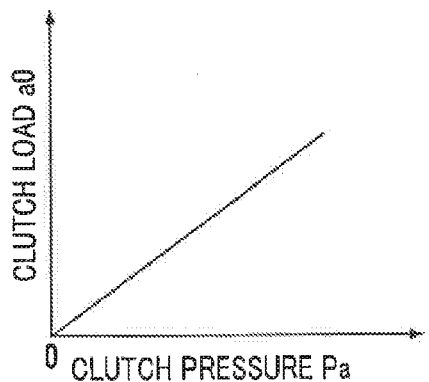
FIG. 3($a$) is an example graph illustrating a characteristic between an actual pressure Pa of the start clutch and a load upper limit value a0 of the start clutch according to an embodiment of the present invention.
Figure 3:
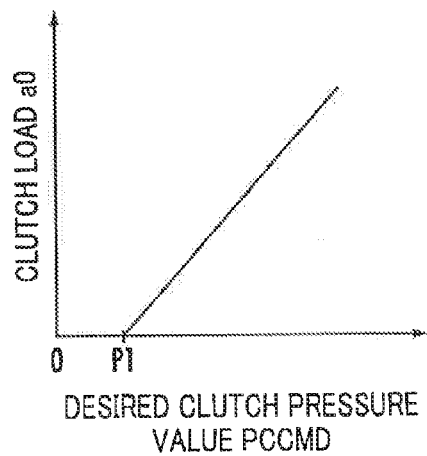
Figure 3:
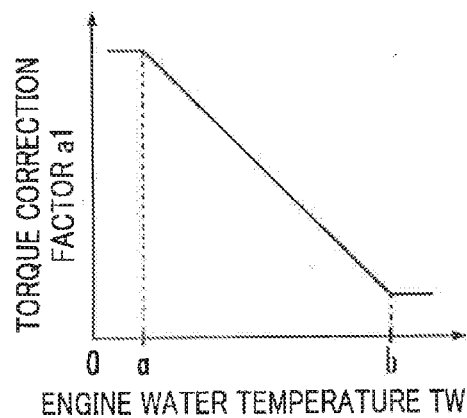
Figure 3:
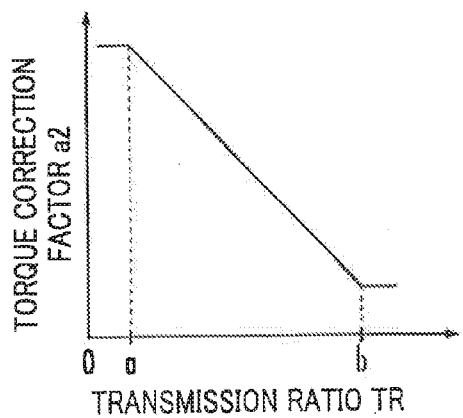
Figure 3:
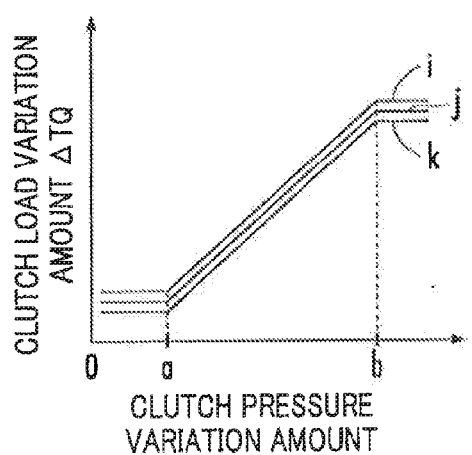

In FIG. 3(a), the horizontal axis denotes the pressure Pa (unit: kgf/cm$^2$) of the start clutch and the vertical axis denotes the load upper limit value a0 of the start clutch (unit: Nm).

The pressure Pa of the start clutch is obtained by subtracting the reactive stroke pressure from the desired pressure value PCCMD of the start clutch. In other words, the pressure Pa of the start clutch is referred to as a pressure for pushing the driving side and the driven side of the start clutch against each other. The reactive stroke pressure is determined through learning; therefore, the value thereof may fluctuate.

FIG. 3(b) illustrates a characteristic curve in which the horizontal axis of FIG. 3(a) is changed to the desired pressure value of the start clutch PCCMD (The vertical axis remains at the same as FIG. 3(a)), The P1 in FIG. 3(b) denotes the reactive stroke pressure of the start clutch. In other words, the pressure from 0 to P1 denotes the released state of the start clutch.

The characteristic curve of the load upper limit value a0 of the start clutch is determined according to the performance of the start clutch. If a load input to the start clutch is greater than the load upper limit value a0 associated with the engaged state of the start clutch, the revolution number of the engine increases. When the pressure is from 0 to P1, since the start clutch is in the released state, the upper limit value a0 is equal to zero; when the pressure is greater than P1, the load upper limit value a0 of the start clutch increases as the pressure of the start clutch increases.

In the present embodiment, a table is expected to be prepared preliminarily; therefore, the present embodiment uses the table in FIG. 3(a) possessing a characteristic without being affected by the reactive stroke P1 which fluctuates through learning.

Thereafter, the procedure advances to step ST5 where the transmission control device 31 determines a correction factor a1 for correcting the response delay on the output torque from the engine. The correction factor a1 is determined by searching a preliminarily prepared table possessing a characteristic illustrated by an example in FIG. 3(c).

In FIG. 3(c), the horizontal axis denotes the cooling water temperature TW of the engine (for example, from −25° C. to 120° C.), and the vertical axis denote the correction factor a1 of the output torque of the engine (a dimensionless number ranging from 0 to 5, for example). The numeral "a" in FIG. 3(c) denotes a predetermined low temperature and the "b" in FIG. 3(c) denotes a predetermined high temperature.

When the water temperature TW is low, the revolution number of the engine increases moderately, which brings about a response delay on the output torque; therefore, the correction factor a1 is configured to be greater as the water temperature TW is low and be smaller as the water temperature TW is high.

When the water temperature TW≤a, the correction factor a1=a fixed value (upper limit); when the water temperature TW≥b, the correction factor a1=a fixed value (lower limit). Here, the water temperature is set within a normal temperature range.

Next, the procedure advances to step ST6 where the transmission control device 31 determines a correction factor a2 for the transmission ratio TR of the transmission. The correction factor a2 is determined by searching a preliminarily prepared table possessing a characteristic illustrated in FIG. 3(d).

In FIG. 3(d), the horizontal axis denotes the transmission ratio TR of the transmission (a dimensionless number ranging from 0.43 to 2.52, for example), and the vertical axis denotes the correction factor a2 for the output torque of the engine (a dimensionless number ranging from 0 to 6, for example). The numeral "a" in FIG. 3(d) denotes a predetermined transmission ratio and the numeral "b" in FIG. 3(d) denotes a predetermined transmission ratio.

As the transmission ratio TR is low, since the output torque of the transmission is small, the correction factor a2 is configured to be greater; as the transmission ratio is high, since the output torque is great, the correction factor a2 is configured to be smaller. Thereby, engine failure is prevented from occurring due to insufficient output torque.

At a transmission ratio TR≤a, the correction factor a2=a fixed value (upper limit); at a transmission ratio TR≥b, the correction factor a2=a fixed value (lower limit).

In the present embodiment, a transmission ratio calculating unit is configured to calculate the transmission ratio TR as a rate between the revolution number of the driving side and the revolution number of the driven side (a rate obtained by dividing the input revolution number by the output revolution number). It is also acceptable to calculate the transmission ratio TR as a rate between the output torque and the input torque (a rate obtained by dividing the output torque by the input torque).

Thereafter, the procedure advances to step ST7 where the transmission control device 31 calculates an initial value of a previous limit value TQ0 of the output torque of the engine according to the following expression.

$$TQ0 = a0 \times a1 \times a2$$

An appropriate initial value of the output torque of the driving source can be obtained by correcting the output torque of the driving source by the use of the correction factor a1 related to the cooling water temperature TW of the engine and the correction factor a2 related to the transmission ratio TR of the transmission when the accelerator pedal is manipulated with respect to the load upper limit value a0 of the start clutch related to the pressure Pa of the start clutch when the accelerator pedal is manipulated.

Thereafter, the procedure advances to step ST8 where the transmission control device 31 turns on the control mode (e.g., changes the state to control mode on) and terminates the control process.

As mentioned above, when the control condition is satisfied at step ST2, the initial value of the previous limit value TQ0 of the output torque of the engine is determined according to the procedure from step ST4 to step ST8.

Figure 4:
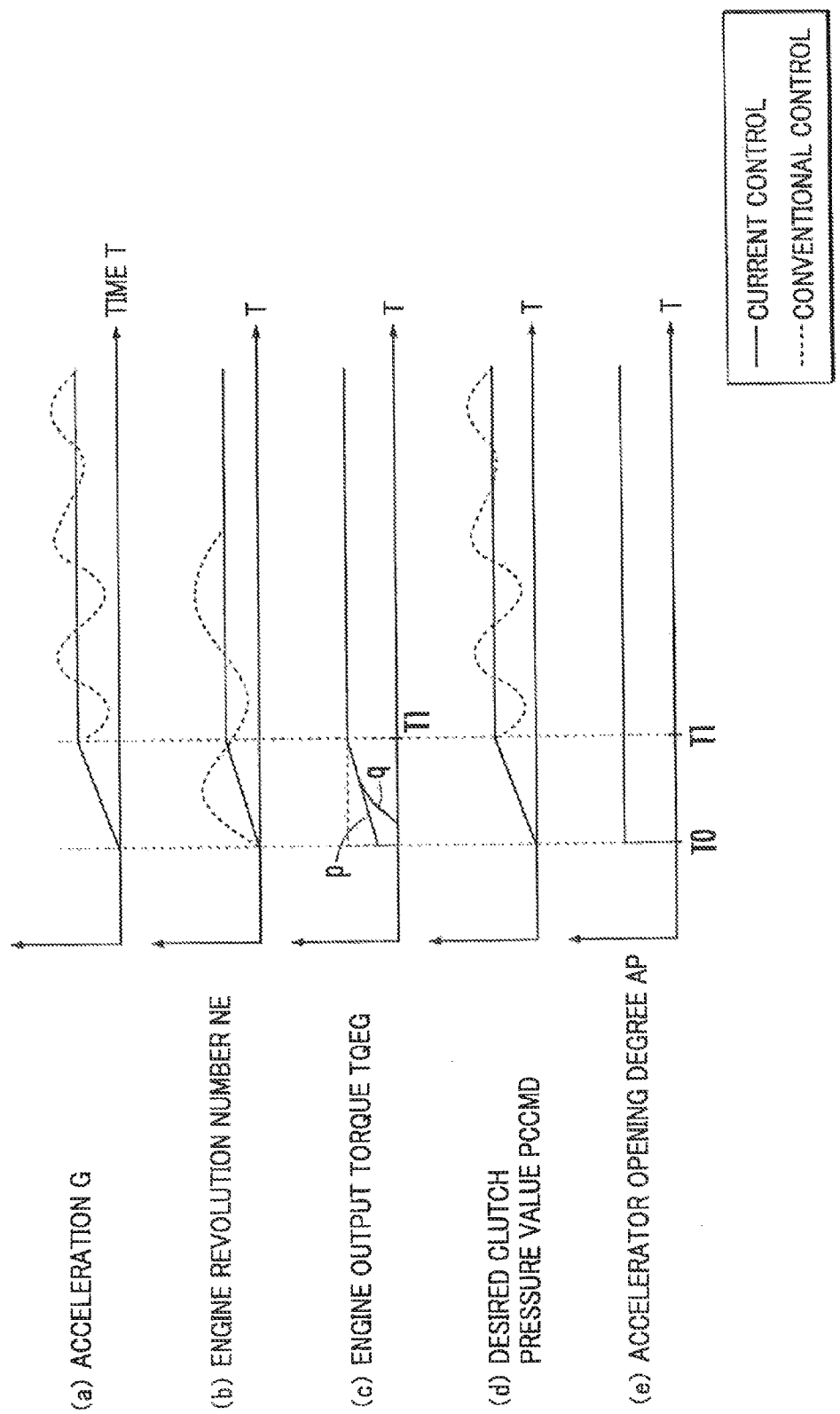
FIG. 4 is an example graph illustrating parameter variations of (a) an acceleration G of the vehicle, (b) an engine revolution number NE, (c) an actual engine output torque TQEG, (d) a desired pressure value PCCMD of the start clutch, and (e) an accelerator opening degree AP with time.

FIG. 4 is an example illustrating a temporal variation (hereinafter, referred to as "pattern") of each value of the acceleration G, the revolution number NE of the engine, the output torque TQEG of the engine, the desired pressure value PCCMD of the start clutch, and the accelerator opening degree AP. The vertical axis denotes the value of each parameter, and the horizontal axis denotes the time.

There are two kinds of patterns illustrated by a solid line and a dashed line, respectively. The solid line denotes the pattern by the current control, and the dashed line denotes the pattern by the conventional control. In the output torque TQEG of the engine, the current control has two patterns illustrated by the solid lines p and q. The pattern p denotes a pattern of a desired output torque of the engine, and the pattern q denotes a pattern of an actual output torque related to the response delay of the output torque of the engine.

The time T0 denotes a timing where the accelerator pedal is manipulated, and the value of each parameter varies after the time T0. The time T1 denotes a timing where the control process is terminated.

In the conventional control, when the accelerator pedal is manipulated at the time T0, the output torque TQEG of the engine increases abruptly; however, the desired pressure value PCCMD of the start clutch increases gradually. In other words, since the output torque TQEG of the engine is greater than the load upper limit value a0 of the start clutch, the revolution number NE of the engine becomes higher. Since the load upper limit value a0 becomes higher as the desired pressure value PCCMD of the start clutch becomes higher gradually, the revolution number NE of the engine decreases. After the time T1, the revolution number NE of the engine varies as the variation of the desired pressure value PCCMD of the clutch, therefore, the acceleration G of the vehicle varies, which makes it a problem to perform a smooth startup.

The initial value of the previous limit value TQ0 calculated at step ST7 denotes the value of the output torque TQEG of the engine in the pattern p at time T0 in FIG. 4.

Returning back to FIG. 2, when the control mode is on at step ST1 (e.g., when the control mode is in an "on" state), the procedure advances to step ST9 where the transmission control device 31 obtains the variation amount ΔTQ of the load upper limit value of the start clutch in the current control cycle. The variation amount ΔTQ is determined by searching a preliminarily prepared table possessing a characteristic illustrated in FIG. 3(e).

In FIG. 3(e), the horizontal axis denotes the variation amount of the pressure of the clutch per control cycle (unit: kgf/cm² per control cycle), and the vertical axis denotes the variation amount ΔTQ of the load upper limit value of the clutch per control cycle (unit: Nm/control cycle). The numeral "a" in FIG. 3(e) denotes a predetermined variation amount and the numeral "b" in FIG. 3(e) denotes a predetermined variation amount. Since the characteristic of the start clutch varies according to the oil temperature OT, plural characteristic curves are prepared according to the oil temperature OT; therefore, there are 3 kinds of graphs i, j and k illustrated in the drawing. As the oil temperature OT is low, the friction factor becomes lower; therefore, as the oil temperature is low, the curve k is used; and as the oil temperature is high, the curve i is used. In the drawing, there are only 3 kinds of curves exemplified; however, it is acceptable to prepare appropriately the kinds of curves according to the variation degree of the friction factor in relation to the oil temperature OT.

The variation amount ΔTQ of the load upper limit value of the start clutch possesses such a characteristic that the variation amount ΔTQ of the load upper limit value of the start clutch becomes smaller as the variation amount of the pressure of the start clutch is small and becomes greater as the variation amount of the pressure of the start clutch is great. In other words, as the pressure pressing the driving side and the driven side of the start clutch against each other increases, the upper limit of the load on the start clutch increases; thereby, the variation amount ΔTQ of the load upper limit value becomes greater.

At a clutch pressure variation amount ≤a, the clutch load variation ΔTQ=a fixed value (lower limit), and at a clutch pressure variation amount ≥a, the clutch load variation ΔTQ=a fixed value (upper limit). Here, the clutch is set to work in a normal working range.

Next, the procedure advances to step ST10 where the transmission control device 31 determines the correction factor a2 of the transmission ratio TR of the transmission, similar to the step ST6.

Thereafter, the procedure advances to step ST11 where the transmission control device 31 calculates a current limit value TQ1 of the output torque of the engine according to the following expression.

$$TQ1 = TQ0 + \Delta TQ \times a2$$

The current limit value TQI denotes the period from time T0 to T1 in the pattern p of the output torque TQEG of the engine in FIG. 4. The variation amount of the desired pressure value PCCMD of the start clutch corresponds to the slope of each control cycle of the desired pressure value PCCMD of the start clutch from time T0 to T1 in FIG. 4. According to the slope, the slope of the pattern p of the output torque TQEG of the engine from time T0 to T1 is determined at the step ST11.

The procedure from step ST9 to step ST11 is equivalent to the process by the first torque determining unit 31a1 in the present invention.

Thereafter, the procedure advances to step ST12 where the transmission control device 31 determines whether or not the current limit value TQ1 is less than an output torque TQAP of the engine determined based on the manipulated amount of the accelerator pedal. The value of the output torque TQAP is determined by the second torque determining unit 31a2.

If the determination result of step ST12 is YES, the procedure advances to step ST13 where the transmission control device 31 sets the previous limit value TQ0 as the current limit value TQ1, and output a signal to ECU 20 to limit the output torque of the engine. Subsequently, the procedure advances to step ST14 where the transmission control device 31 turns on the control mode (e.g., changes the state to control mode on) and terminates the control process.

If the determination result of step ST12 is NO, the procedure advances to step ST15 where the transmission control device 31 turns off the control mode (e.g., changes the state to control mode off) and terminates the control process.

The process of step ST12 and ST13 is equivalent to the process by the torque limiting unit 31a3.

As mentioned above, if the control condition is satisfied at step ST2, the transmission control device 31 determines the initial value TQ0 of the output torque of the engine at step ST4 to step ST8, determines the current limit value TQ1 of the output torque of the engine according to the variation amount of the pressure of the start clutch at step ST9 to step ST11, and as long as the current limit value TQ1 is less than the output torque TQAP of the engine determined according to the manipulated amount of the accelerator pedal, determines the limit torque of the output torque of the engine at step ST9 to step ST11.

In the solid lines (the patterns in the present invention) in FIG. 4, step ST9 to step ST11 are equivalent to time T0 to time T1; and at time T1, the determination result of step ST12 is NO, the control process is terminated.

As mentioned above, in the present embodiment, after the accelerator pedal is manipulated while the start clutch is in the released state, the initial value of the output torque of the engine is determined according to the desired pressure value PCCMD of the engine, the water temperature TW of the engine and the transmission ratio TR. of the transmission. Thereafter, as long as the current limit value TQ1 of the output torque of the engine determined according to the variation amount of the pressure of the clutch and the oil temperature OT is less than the output torque TQAP of the engine determined according to the manipulated amount of the accelerator pedal, the output torque of the engine is limited to the current limit value TQ1.

Thereby, at the startup of the vehicle, the revolution number of the engine is restrained so that the input torque of the transmission is lower than the torque output from the engine according to the manipulated amount of the accelerator pedal, which enables a smooth startup.

INDUSTRIAL APPLICABILITY

The start clutch control device of the present invention described in the above can be practically and effectively used in a vehicle disposed with a start clutch.

The invention claimed is:

1. A start clutch control device configured to control a connection between a driving side and a driven side of a vehicle through a start clutch disposed between the two sides, comprising:
a transmission control device comprising a central processing unit (CPU) and a storage device adapted to store determined values, and further comprising:
a first torque determining unit configured to determine a first value of a torque input to a transmission of the vehicle from a driving source of the vehicle based on a load acting on the start clutch;
a second torque determining unit configured to determine a second value of a torque input to the transmission of the vehicle from the driving source of the vehicle based on a manipulated amount of an accelerator pedal of the vehicle; and
a torque limiting unit configured to limit the torque input to the transmission to the first value determined by the first torque determining unit as long as the first value determined by the first torque determining unit is less than the second value determined by the second torque determining unit after the accelerator pedal is manipulated while the start clutch is in a released state,
wherein:
the first torque determining unit is provided with a first torque correcting unit configured to correct the first value of the torque input to the transmission according to a variation amount of the load acting on the start clutch in each control cycle;
the first torque correcting unit corrects the torque input to the transmission according to a correction value possessing such a characteristic that the value thereof increases or remains at the same value as the variation amount of the load increases;
the second torque determining unit is provided with a transmission ratio calculating unit configured to calculate a transmission ratio of the transmission and a second torque correcting unit configured to correct the second value of the torque input to the transmission according to the transmission ratio;
the start clutch is controlled by oil pressure and arranged on a downstream side of the transmission; and
the variation amount of the load acting on the start clutch is based at least in part on a delayed transmission of the oil pressure of the start clutch.

2. The start clutch control device according to claim 1, wherein:
the first torque determining unit is provided with a cooling water temperature detecting unit configured to detect a temperature of a cooling water used to inhibit a temperature of the driving source from increasing and a third torque correcting unit configured to correct the first value of the torque input to the transmission according to the temperature of the cooling water; and
the third torque correcting unit corrects the first value of the torque input to the transmission according to a first correction factor possessing such a characteristic that the value thereof decreases or remains at the same value as the temperature of the cooling water increases.

3. The start clutch control device according to claim 1, wherein:
the transmission ratio calculating unit calculates the transmission ratio denoted by a rate between an output torque of a driven side and an input torque of a driving side of the transmission, and
the second torque correcting unit corrects the first value of the torque input to the transmission according to a second correction factor possessing such a characteristic that the value thereof decreases or remains at the same value as the transmission ratio increases.

4. The start clutch control device according to claim 1, further comprising:
a transmission ratio calculating unit that calculates a transmission ratio denoted by a rate between a revolution number of a driving side and a revolution number of a driven side of the transmission, and
a third torque correcting unit that corrects the first value of the torque input to the transmission according to a correction factor possessing such a characteristic that the value thereof decreases or remains at the same value as the transmission ratio increases.

5. The start clutch control device according to claim 1, wherein:

the variation amount of the load is based at least in part on a variation amount of a pressure value corresponding to the start clutch oil temperature; and the variation amount of the load, the variation amount of the pressure value of the start clutch, and the oil temperature are obtained from a table stored in memory.

6. The start clutch control device according to claim 1, wherein:

the variation amount of the load acting on the start clutch is based at least in part on a variation amount of start clutch pressure.

* * * * *